April 13, 1965  J. R. HUBER  3,178,216
CARGO PALLET CONSTRUCTION
Filed May 31, 1961  4 Sheets-Sheet 1
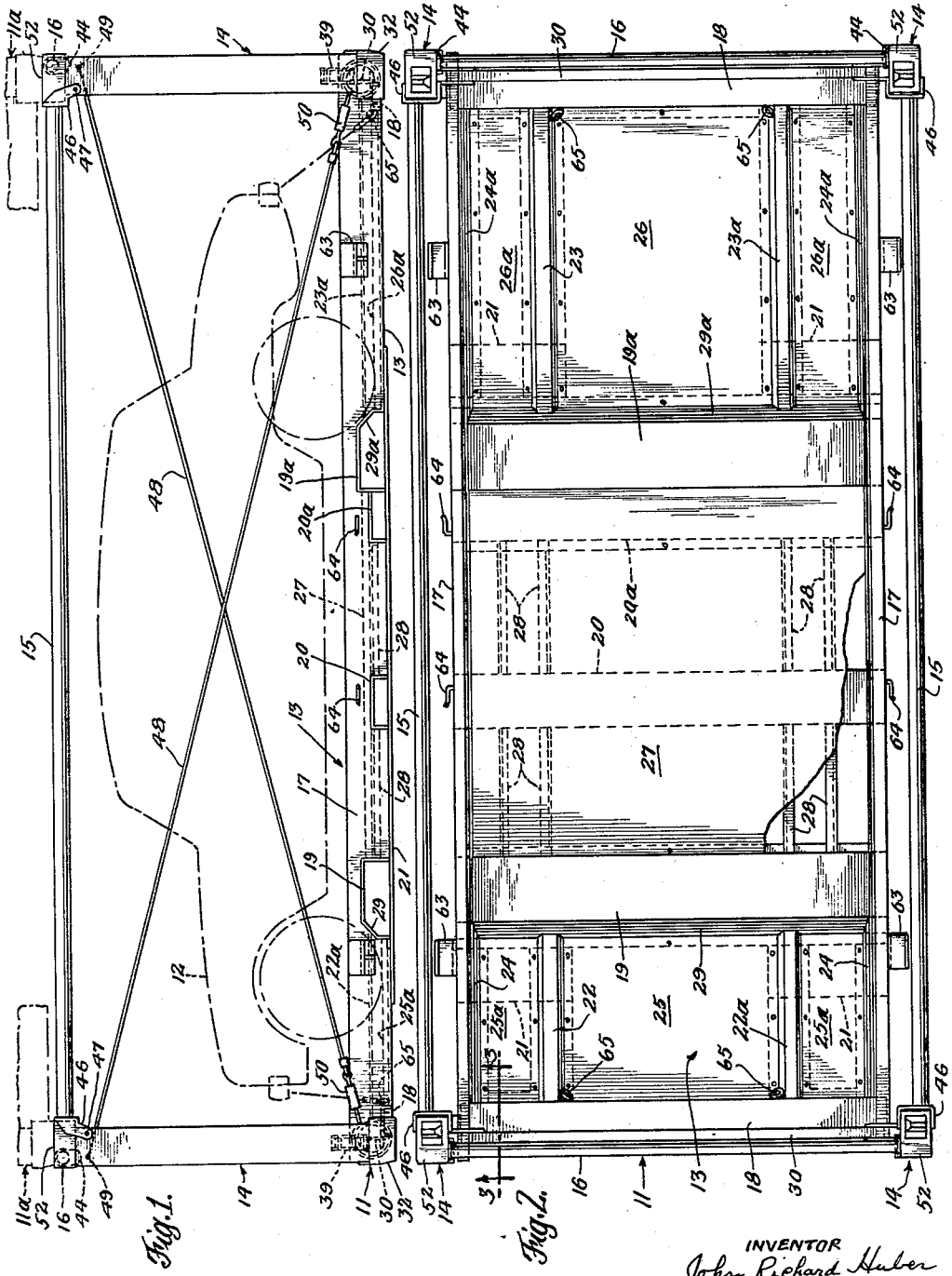
INVENTOR
John Richard Huber
BY Harris S. Campbell
ATTORNEY

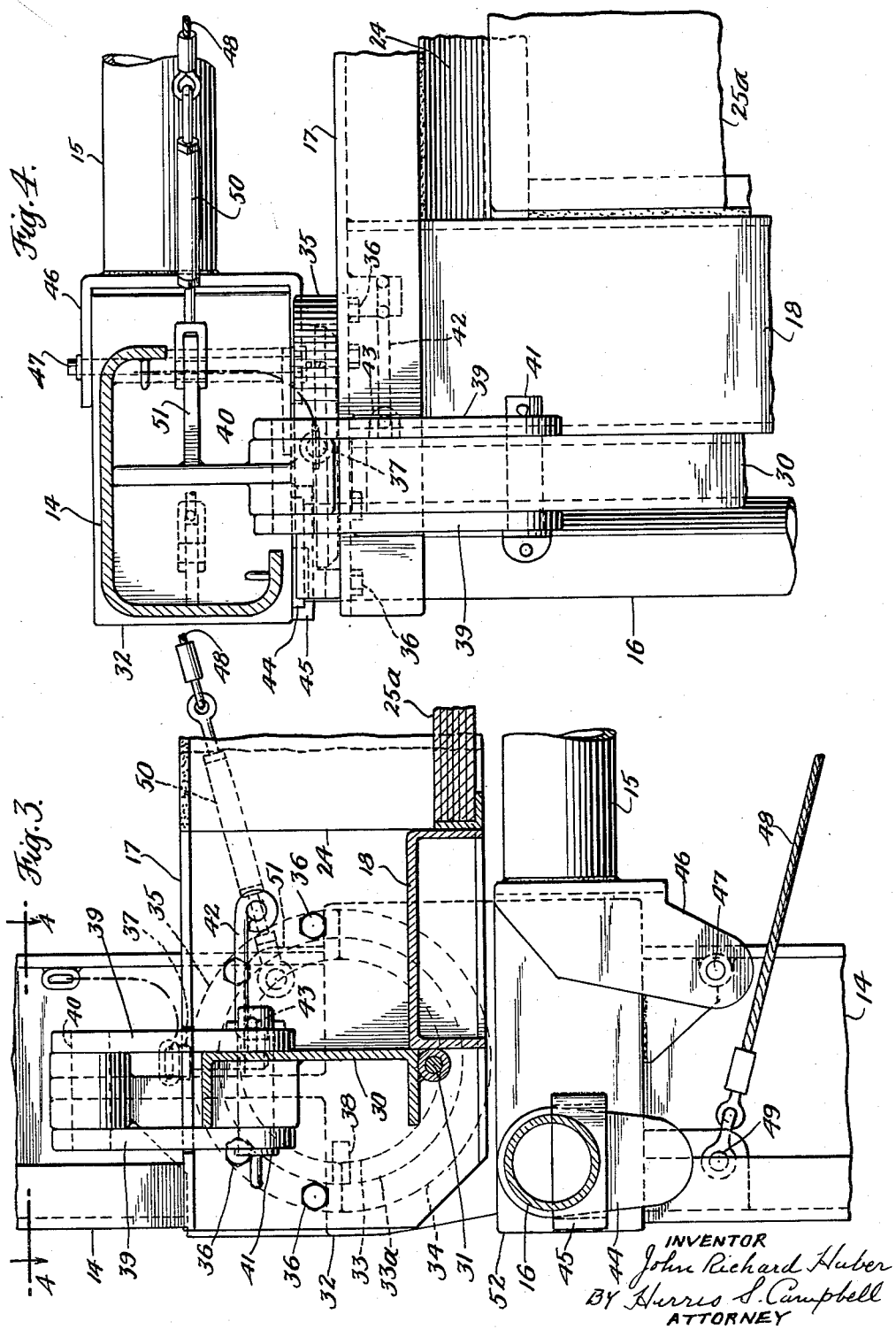

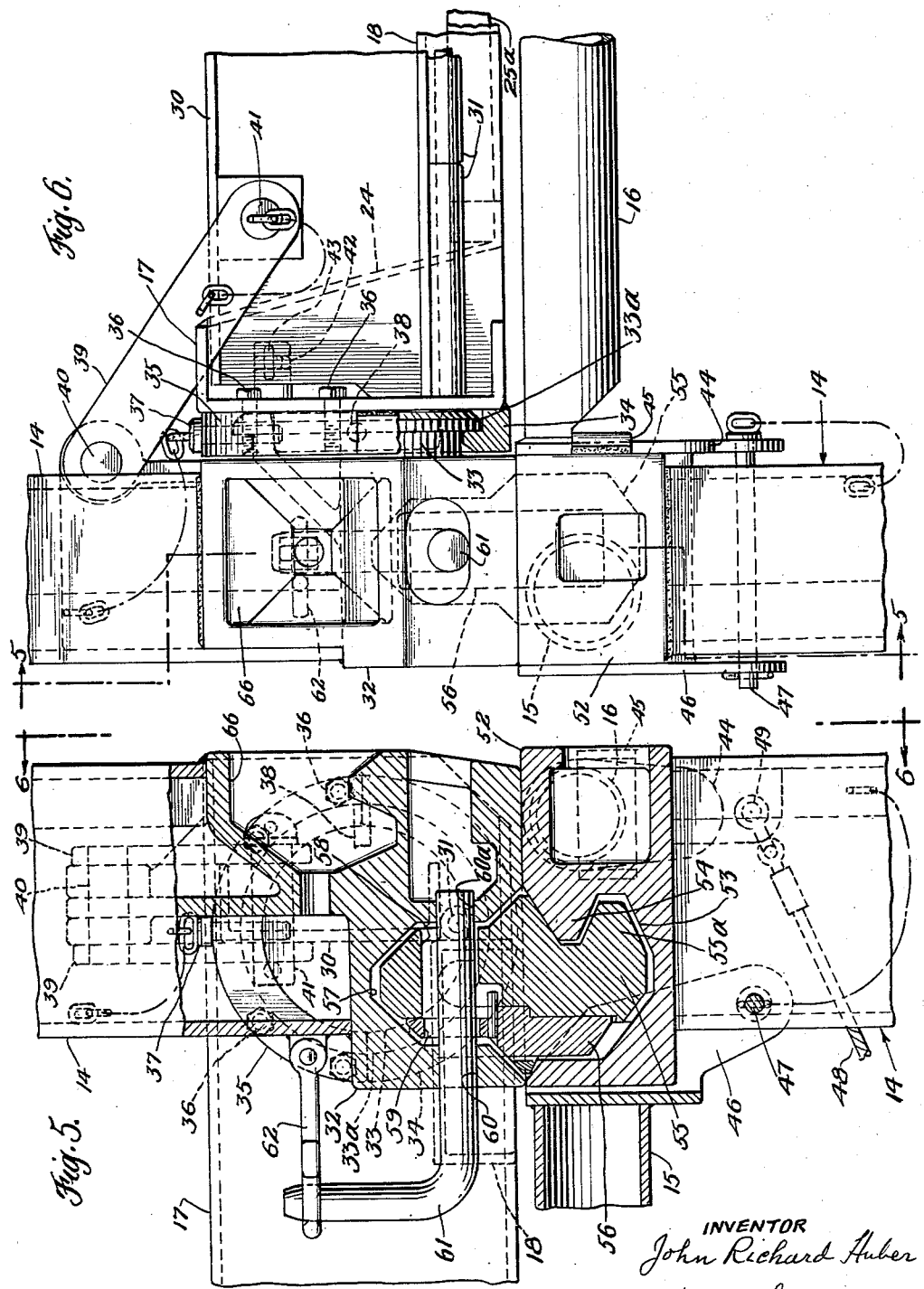

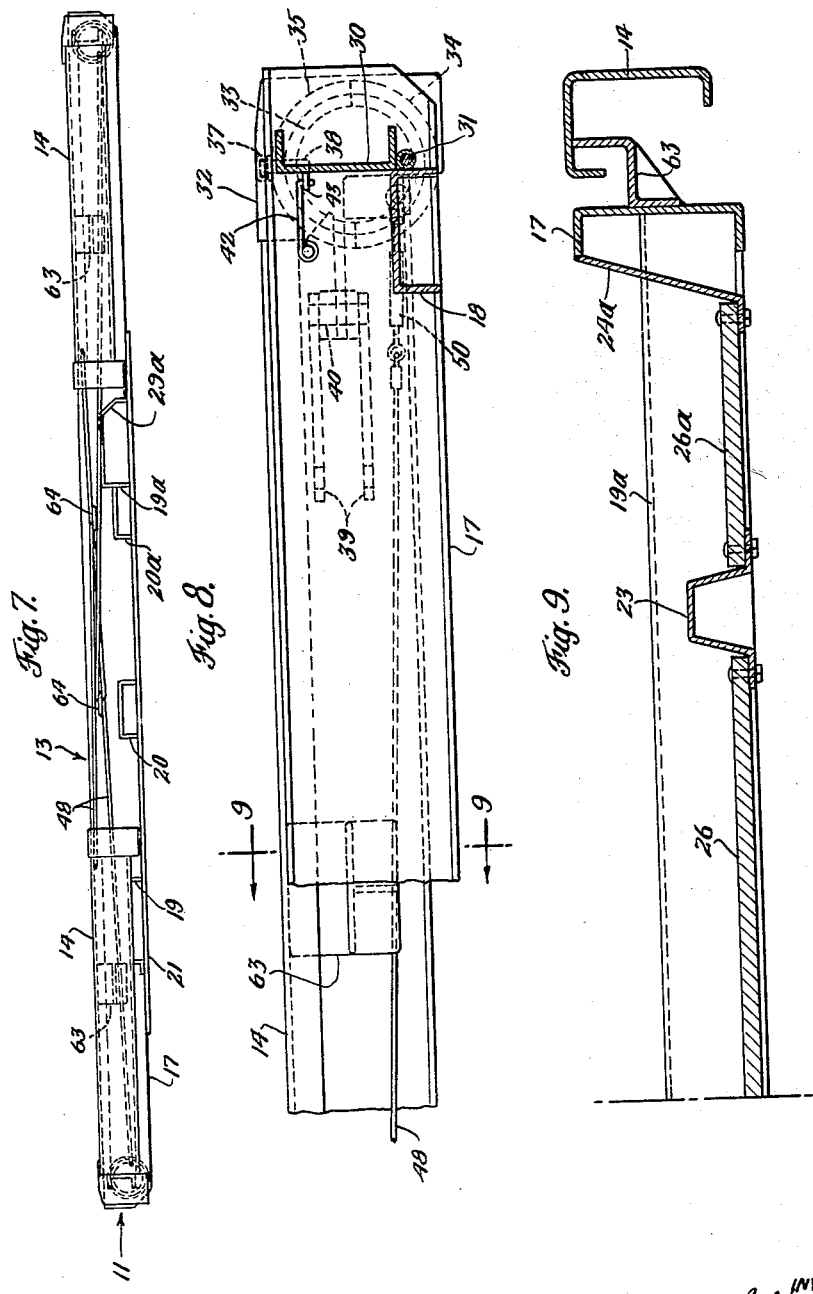

United States Patent Office 3,178,216
Patented Apr. 13, 1965

3,178,216
CARGO PALLET CONSTRUCTION
John Richard Huber, Holicong, Pa., assignor to Eastern Rotorcraft Corporation, Doylestown, Pa., a corporation of Pennsylvania
Filed May 31, 1961, Ser. No. 113,864
7 Claims. (Cl. 294—67)

This invention relates to pallets suitable for supporting and transferring cargo loads during shipping operations and is particularly concerned with pallet structures capable of transferring a cargo load from a superimposed pallet without requiring the cargo proper to transmit loads from a higher tier.

In the shipping of various cargo loads such as, for example, automotive vehicles, it is desirable to provide a pallet structure on which the cargo may be loaded. This pallet structure is preferably built to permit handling the cargo in an effective manner by several different kinds of handling equipment. In addition the pallet structure should protect the cargo supported on it against damage from the various handling and loading and unloading operations and also to prevent damage from other cargo carried adjacent to it during the movements of the transporting vehicle. It is an object of the present invention to provide a pallet construction which permits lifting the loaded pallet by means of a lift truck having its forks inserted underneath the floor of the pallet while the structure of the pallet also allows the load to be moved by an overhead crane or similar lifting equipment by engaging the upper portion of the pallet structure. This object of the invention includes the provision of pallet structure such that the loaded pallet may be lifted in various ways utilizing various available types of sling equipment or special equipment while protecting the cargo against actual contact with the handling equipment. Thus the cargo is protected by the pallet structure against damage from handling operations.

During shipment particularly in ocean going vessels it is desirable to stack loaded pallets several tier deep in order to utilize available cargo space effectively. It is an important object of this invention to provide pallet structure which permits the rapid positioning of the pallets and which provides for their secure retention in position in the carrying vehicle and against movement with respect to each other. A more specific object is the provision of a suitable fitting to connect the bottom of the pallet to the floor or to the upper side of another pallet on which it may be supported. The fitting is preferably constructed so that both surfaces are flush and the interconnecting structure is a separate disconnectible part which projects upwardly and downwardly into sockets into the adjacent surfaces.

After the cargo has been unloaded from the pallets, according to the present invention the structure can be collapsed into a folded position so that the pallets may be stored in a limited space in the warehouse or other suitable storage area. It is an important object of this invention to provide a pallet structure in which corner posts are supported to the floor structure by pivotal means and the upper frame members are removable thus allowing the pallet to be collapsed so that it requires little more space than the floor portion. This object of the invention further includes the provision of structure which allows the attachment of one pallet to another when in collapsed relationship by means of the same type of socket construction that is used for connecting them when in the cargo carrying position. This allows the slinging or lifting of a plurality of pallets by means of sling equipment or fork lift loaders thus assuring the rapid handling of the pallets to or from storage.

A further object of the invention is the provision of tunnel structure in the floor portion of the pallet to allow the insertion of the beams of the fork lift equipment transversely of the pallet. This object includes a reinforced tunnel structure so that the pallet floor is strong enough to permit it to be lifted from the ends when so desired. This object encompasses the special location of the tunnels with respect to the ends of the floor structure wherein one tunnel is located closer to one end of the pallet floor than the other tunnel is to the opposite end of the floor. This particular location of the tunnels is of particular value when the pallets are loaded with automotive vehicles in which a longer overhang is provided at one end of the vehicle than at the other. The vehicles may thus be loaded on a pallet with the wheels adjacent the tunnel structure so that both the forward end of the vehicle and the rearward end of the vehicle will be inside the post structure of the pallet. In this way the vehicle will be protected against damage from contact with other cargo from adjacent pallets. With this construction full advantage may be taken of the total area of the pallet. By using the unsymmetrical tunnel spacing the condition is avoided where one pair of wheels may need to rest on one of the tunnels with resultant raising of a portion of the vehicle. This spacing also provides more opportunity for using the tunnels as chocks to restrain the vehicle on the pallet.

How the foregoing and other objects and advantages are attained will be clear from the following description of the figures in which:

FIGURE 1 is a side elevational view of a pallet carrying a load.

FIGURE 2 is a plan view of the pallet structure shown in FIGURE 1.

FIGURE 3 is a sectional view to an enlarged scale taken along the line 3—3, FIGURE 2, and showing the construction of the upper corner of one pallet and the lower corner portion of another.

FIGURE 4 is a sectional plan view taken in the direction of arrows 4—4, FIGURE 3.

FIGURE 5 is an elevational view partly in section taken along the line 5—5, FIGURE 6, showing the interconnecting structure between two pallets.

FIGURE 6 is an end elevation of the portion of the structure shown in FIGURE 5, the view being taken in the direction of arrows 6—6, FIGURE 5.

FIGURE 7 is a side elevational view of the pallet device with the corner posts shown in folded position with relation to the floor.

FIGURE 8 is a sectional elevation taken at one end of the structure to a scale larger than the scale of FIGURE 7 and showing the relation of the corner post in folded position.

FIGURE 9 is a sectional view taken in the direction of arrows 9—9, FIGURE 8.

Referring to the drawings, FIGURES 1 and 2 illustrate the general construction of the pallet according to the present invention. The pallet is shown at 11 in FIGURE 1 with a load consisting of vehicle 12 being illustrated in chain-dotted outline supported on the pallet. The floor structure 13 is arranged with corner posts 14 extending vertically upwardly, posts 14 being connected at the upper ends by longitudinal rails 15 and transverse rails 16. In FIGURE 1 a second pallet unit 11a is partially shown in chain-dotted outline supported at the upper corners of the lower pallet structure 11. The general pallet construction including the posts is arranged to provide for adequate support of loaded pallets in stacked relationship to each other.

The floor structure 13 of the pallet as will be observed by reference to various of the figures includes longitudinal side frame or beam members 17 which are held in proper relative position by various transverse frame or beam members. The transverse end members 18 are shown as channel shaped elements having their open face downwardly. Main forklift tunnel structures 19 and 19a serve as additional transverse frame elements as do smaller transverse tunnel structures 20 and 20a. As will be noted in FIGURE 1 the tunnel structures 19 and 19a are located unsymmetrically with respect to the ends of the floor. This allows the wheels of a vehicle to be positioned in front of and behind these tunnel structures, the transverse structure 19a providing a greater space for a vehicle with a long overhang to be thus properly positioned within the periphery of the floor structure. The transverse tunnel or beam structures, 19, 19a and 20, 20a extend completely through the floor structure including the side frames 17. However the floor structure is reinforced by means of longitudinally extending plates 21 which may be welded into the structure of the pallet floor 17. The main tunnel structures 19, 19a provide for lifting the loaded pallet with a large capacity forklift truck. This construction permits entry of lift truck forks from either side of the pallet and allows handling of loaded pallets in either single units or in stacked units. The smaller and more closely spaced tunnel structures 20 and 20a are located approximately symmetrically with respect to the center of the pallet and provide for lifting the unloaded pallet with a smaller type of forklift device. When the pallets are unloaded they may be thus be handled in folded condition if desired, by a small forklift truck which is capable of maneuvering into more confined spaces for accomplishing storage of the pallets.

Between the main tunnel structure 19 and the end member 18 auxiliary longitudinal beams 22 and 22a extend to provide additional members to support the floor in the region where the concentrated loads may be applied, for example at the vehicle wheels. Similarly between transverse primary tunnel structure 19a and the end frame member 18 similar longitudinal beam members 23 and 23a extend. A wheel guide member 24 (see also FIGURE 6) extends along side frames 17 between tunnel member 19 and the transverse end frame member 18 and a similar wheel guide 24a attached to side frames 17 extends between tunnel member 19a and the opposite end frame 18. The floor structure 13 may consist of panels 25 and 25a which may be of heavy plywood. Similarly between 19a and end frame 18 panels 26 and 26a may be used. Between the tunnel structures 19 and 19a the central floor panel 27 extends over the top of tunnel structures 20 and 20a, structural angles 28 being supplied to stiffen the floor in the region where a rolling load may occur. It will be noted that the floor level is lower in the end panel regions where the wheels of the vehicle may rest thus providing maximum head room. In order to reduce the problem of moving the vehicle over the large tunnel structures 19 and 19a the corners of the tunnels facing the ends of the pallet are preferably beveled as illustrated at 29, 29a.

At each end of the pallet there is a transverse structural member 30 which may be channel shaped and which is fastened to one of the transverse end frame members 18 by a hinge 31. This hinge is most clearly seen in FIGURES 3 and 6.

By referring to FIGURES 4, 5 and 6 the manner in which each corner post 14 is attached to the frame 17 of the pallet will be evident. The post 14 engages at its lower end the main post fitting 32 to which it is permanently fastened as by welding. A trunnion structure 33 is integrally formed with the main fitting 32. An annular lip 33a engages the groove in the supporting bearing member 34 which is in the form of a semi-circular structure attached to the pallet side frame 17, for example, by welding. The other portion of the retention fitting is also in the form of a semi-circular element 35 which is attached to the longitudinal frame 17 by means of bolts 36. In this way the part 35 of the retention bearing may be removed to permit dismounting the post from the pallet for assembly and disassembly purposes. A removable locking pin 37 can be inserted through mating holes in the trunnion 33 and the supporting bearing 34 so as to maintain the post 14 in the vertical adjusted position. Another hole 38 is located in the trunnion structure 33 at a position 90 degrees away from the hole through which the pin 37 is shown. Hole 38 provides for positioning and locking the post in the folded position when it has been rotated 90 degrees down alongside of frame 17 (see FIGURES 7 and 8).

The transverse structural member 30, which is attached at its lower corner by hinges 31, is supported in upright position by means of a pair of links 39, 39 which are connected to the post 14 by means of a pivot 40. The lower ends of the links 39 are attached to the structural member 30 by means of a removable pin 41. A small hook 42 which is fastened to longitudinal side member 17 engages an eye 43 attached to the transverse member 30 to hold it in upright position while the links 39 are being connected by means of the pin 41. For loading a vehicle the links 39 are disconnected by removing pin 41 and swung up out of position so that by unlatching hook 42 the rear structural member may be hinged down flat to permit unobstructed loading of the pallet. It will be obvious that the link construction described may be the same at each corner post so that loading may be accomplished from either end. This construction provides a suitable degree of lateral bracing for the corner posts when used in conjunction with the lateral support afforded by the transverse upper end rails 16 which are attached to the post by means of plate fitting 44 attached to the rail 16 and an anchor plate fitting 45 attached to the upper end of post 14 (see particularly FIGURES 3 and 6).

Longitudinal bracing of the posts 14 is provided by the longitudinal rails 15 which are provided with end fittings 46 connected to the upper end of the post by means of pins 47 and diagonal brace cables 48. The upper ends of cables 48 are attached to the post by means of pins 49 and the lower ends of cables 48 are connected by turnbuckles 50 to suitable plates 51 (see FIGURE 4).

The manner in which one pallet is attached to another pallet at the corner posts will be clear by reference to FIGURES 5 and 6. The upper end post fitting 52 is provided with a socket 53 having at one side a projection 54 which extends into the socket 53. A connecting fitting 55 is provided with a toe portion 55a which, after it has been placed in the socket 53, can be moved sideways underneath the projection 54. A separate sliding part 56 can then be moved into position alongside connecting fitting 55 to prevent displacement of the toe portion 55a with respect to the projection 54. The upwardly projecting end of fitting 55 extends into a downwardly facing socket 57 in the lower end post fitting 32. Suitable apertures 58 and 59 in fitting 55 and sliding part 56 as well as openings 60 and 60a in the fitting 32 provide for the entry of a bar 61 which can transfer the load from fitting 55 into the lower end fitting 32. When in load supporting position the bar 61 may be held in place by a pivoted arm 62. By this construction the upper end of a post of one pallet may be securely attached to the lower end of a post of another pallet against axial or transverse displacement.

In this manner the pallets may be stacked when loaded aboard ship or elsewhere in several tiers thus providing effective use of cargo space in a manner which permits rapid and efficient loading. Loading operations may be accomplished by moving two or more pallets fastened together in the manner described. If desired the upper pallet post may be equipped with a fitting 55 and part 56 with the upper end projecting out of the fitting. A sling may be attached through apertures 58 and 59 at each of the four corners of the pallet to provide for lifting the load from above by means of a crane or other lifting equipment. Alternatively the projecting portion of the fitting 55 and part 56 may be plugged into a suitable socket on special lifting equipment such as an overhead conveyor system.

For return trips without a load and for storage, the pallet structure may be folded to reduce the space requirements to a minimum. FIGURES 7, 8 and 9 show the structure in folded position. In these figures the posts 14 are shown swung about their lower pivot fittings to a position parallel to the floor structure of the pallet. Brackets 63 attached to the longitudinal side frame members 17 provide for the support of the posts 14 when folded. To move the structure to folded position the transverse rails 16 are lifted out of their supporting fittings and the longitudinal rails 15 are removed by withdrawing the connecting pins 47. Then by removing the pins 37 from the post bearing members 35 each post 14 may be swung down into folded position against one of the brackets 63. As the posts are folded the diagonal supporting cables 48 will slacken and the slack can be wrapped around fittings 64 attached to the sides of side rails 17.

In the folded position the hole 38 in the bearing member 34 will be in vertical position in registry with the hole for pin 37. By inserting the pin 37 in the folded position the post is held against accidental displacement. With the post 14 folded a socket 66 similar to socket 53 in base fitting 32 is located to open upwardly. To provide for slinging, a fitting 55 with part 56 may be applied to socket 66 and the sling attached to apertures 58, 59.

Suitable anchor fittings such as rings 65 may be provided where convenient for the purposes of securing hold down equipment used to prevent movement of the cargo after it is loaded in position on the pallet.

From the foregoing it will be evident that I have provided an improved cargo pallet construction which may be of sturdy all metal construction and which is suitable for handling a variety of types of loads including vehicles being transported. By providing the particular type of floor structure described a compact yet strong unit may be provided which can be moved by standard forklift equipment. The post and frame structure permits the easy stacking of the pallets one above the other and the fitting connections between the pallets permits more effective handling and positioning of the pallets in relation to each other. The ability to fold the super structure down into the plane of the floor structure gives a compact arrangement which makes handling of the empty pallets easier and improves the storage problem.

I claim:

1. A cargo pallet having a base structure including a pair of longitudinal beam members, a plurality of transverse beams extending through said longitudinal beam members to present open ends for the reception of fork lift handling equipment, a vertical post at each corner of said base structure, each of said posts being foldable from a vertical to a horizontal position, demountable rail members extending between the upper ends of said posts, the lower end of each post including a fitting having a pivot part projecting therefrom and engaging a mating part attached to the base structure, said fitting also incorporating a connector structure in the bottom side having means for engaging a mating connector part to transfer loads therebetween, a second connector structure in said fitting located approximately 90 degrees from said first connector structure to provide for lifting the pallet when said posts are in folded position.

2. A cargo pallet having a base structure with a pair of longitudinal beam members at the sides, a vertical post at each corner of said base structure having a pivotal mounting device attaching each post to the outside of one of the longitudinal beam members for folding said posts alongside said beam members, rail members demountably supported between the upper ends of said posts, a shallow fixed transverse beam extending across the base structure near each end of said longitudinal beam members, a deeper transverse beam hinged to each of said shallow beams, links hinged to each post and extending diagonally to said deeper transverse beam, removable connections between said links and said deeper transverse beams to permit disconnection of the links for folding of each deeper beam about its hinge and for folding of the posts.

3. A cargo pallet having a base structure incorporating a pair of longitudinal beam members, a vertical post at each corner of said base structure having a pivotal attachment between the lower end of each post and said base structure, each of said pivotal attachments including a cylindrical flanged member attached to said post and a complementary flanged part interconnecting said cylindrical flanged member and said base structure, said complementary part being located in the plane of said base structure, rail elements extendable between the upper ends of said posts, diagonal cable bracing in the longitudinal plane between said posts to support the posts in upright position, said rail elements being removable to permit folding said posts about the pivotal attachments to a position in the plane of said base structure, a plurality of brackets attached to said longitudinal beam members to support said posts in folded position and to accommodate the slack in the cable bracing.

4. A cargo pallet having a base structure incorporating a pair of longitudinal beam members, a vertical post at each corner of said base structure having a pivotal attachment between the lower end of each post and said base structure, each of said pivotal attachments including a cylindrical flanged member attached to said post and a complementary flanged part interconnecting said cylindrical flanged member and said base structure, rail elements extendable between the upper ends of said posts, said rail elements being removable to permit folding said posts about the pivotal attachments to a position in the plane of the base structure, the lower end of each post having a socket to receive a fitting for anchoring purposes, diagonal cable bracing in the longitudinal plane between said posts to support the posts in upright position, a plurality of brackets attached to said longitudinal beam members to support said posts in folded position and to accommodate the slack in the cable bracing.

5. A pallet construction according to claim 4 in which the upper end of each post includes a socket having an interior projection suitable for engaging a load transfer fitting.

6. In a cargo pallet having a base construction including longitudinal beams extending along the sides of said base construction, transverse beams shorter than the longitudinal beams, at least a pair of said transverse beams being located adjacent the ends of said base construction and longitudinal beams, upstanding posts at the corners of said base construction, and means bracing the upper end portions of said posts both longitudinally and transversely of the base construction, the combination therewith, of structure enabling said corner posts to be folded for compact shipment of the pallet without load thereon, said structure comprising a pivotal support for each corner post outside said transverse end beams and outside said longitudinal beams, said posts each being provided with said pivotal support the axis of which intersects each post and a longitudinal plane to which said post may be swung to lie parallel with the longitudinal beam and thereby providing that substantially the entire post lies between upper and lower surfaces of the adjacent longitudinal beam, and a rigid support for each post when swung into its folded position, said support being attached to the outside of said longitudinal beam at a point spaced from the axis of said pivotal support.

7. A cargo pallet having a base structure with a pair of longitudinal beam members at the sides, a vertical post at each corner of said base structure having a pivotal mounting device attaching each post to the outside of one of the longitudinal beam members for folding said posts alongside said beam members, rail members demountably supported between the upper ends of said posts, a shallow fixed transverse beam extending across the pallet base structure near each end of said longitudinal beam members, a deeper transverse beam hinged to each of said shallow beams, a fitting at each end of said deeper transverse beam to retain it in its upright position, said fittings being disconnectible to permit swinging said beam about its hinge to facilitate loading a vehicle.

References Cited by the Examiner

UNITED STATES PATENTS

| | | | |
|---|---|---|---|
| 960,281 | 6/10 | Moss | 108—129 |
| 1,291,898 | 1/19 | Hughes | 108—129 |
| 1,795,060 | 3/31 | Vance | 211—178 X |
| 1,905,219 | 4/33 | Crichton | 108—125 |
| 2,521,088 | 9/50 | Phelps | 206—46 |
| 2,692,064 | 10/54 | Koester | 248—120 X |
| 2,699,911 | 1/55 | Chase | 248—120 |
| 2,827,302 | 3/58 | Skyrud | 248—120 X |
| 2,956,763 | 10/60 | D'Arca | 248—120 |
| 3,011,749 | 12/61 | Kozak | 248—361 |

FOREIGN PATENTS 1,201,690    7/59    France.

SAMUEL F. COLEMAN, *Primary Examiner.*

CLAUDE A. LE ROY, ANDRES H. NIELSEN, LOUIS J. DEMBO, *Examiners.*